Nov. 7, 1944.  E. S. LEE  2,362,078
GRAVITY FEED ANIMAL FEEDER
Filed Oct. 31, 1942  2 Sheets-Sheet 1
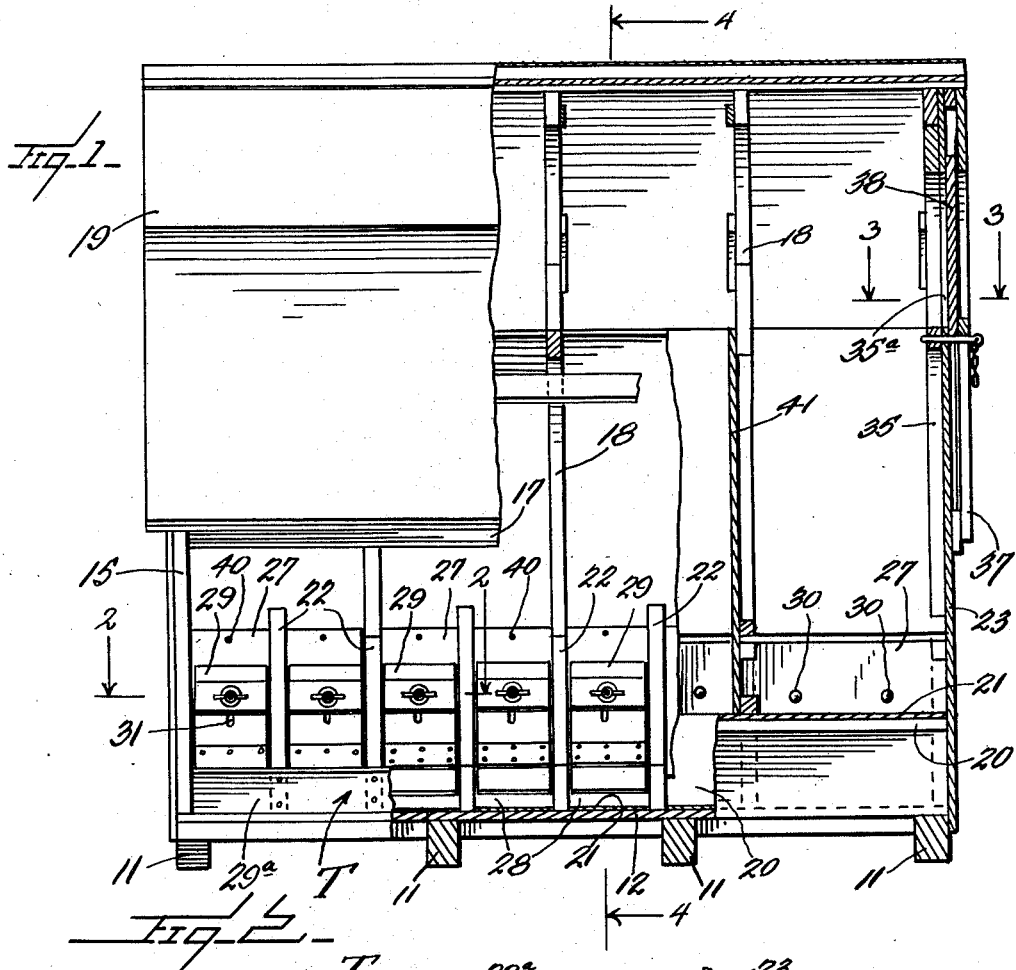
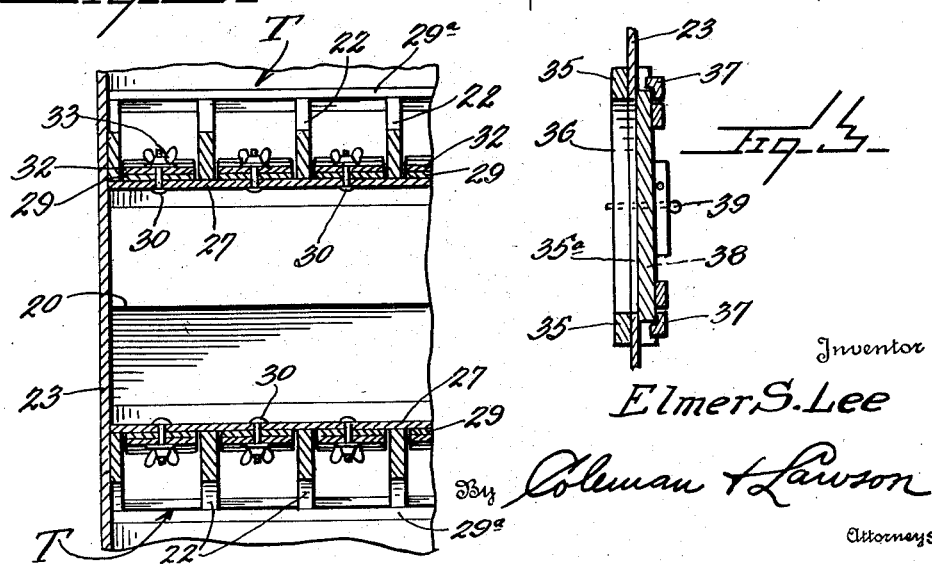
Inventor
Elmer S. Lee
By Coleman & Lawson
Attorneys Nov. 7, 1944.                    E. S. LEE                    2,362,078
                        GRAVITY FEED ANIMAL FEEDER
                    Filed Oct. 31, 1942        2 Sheets-Sheet 2
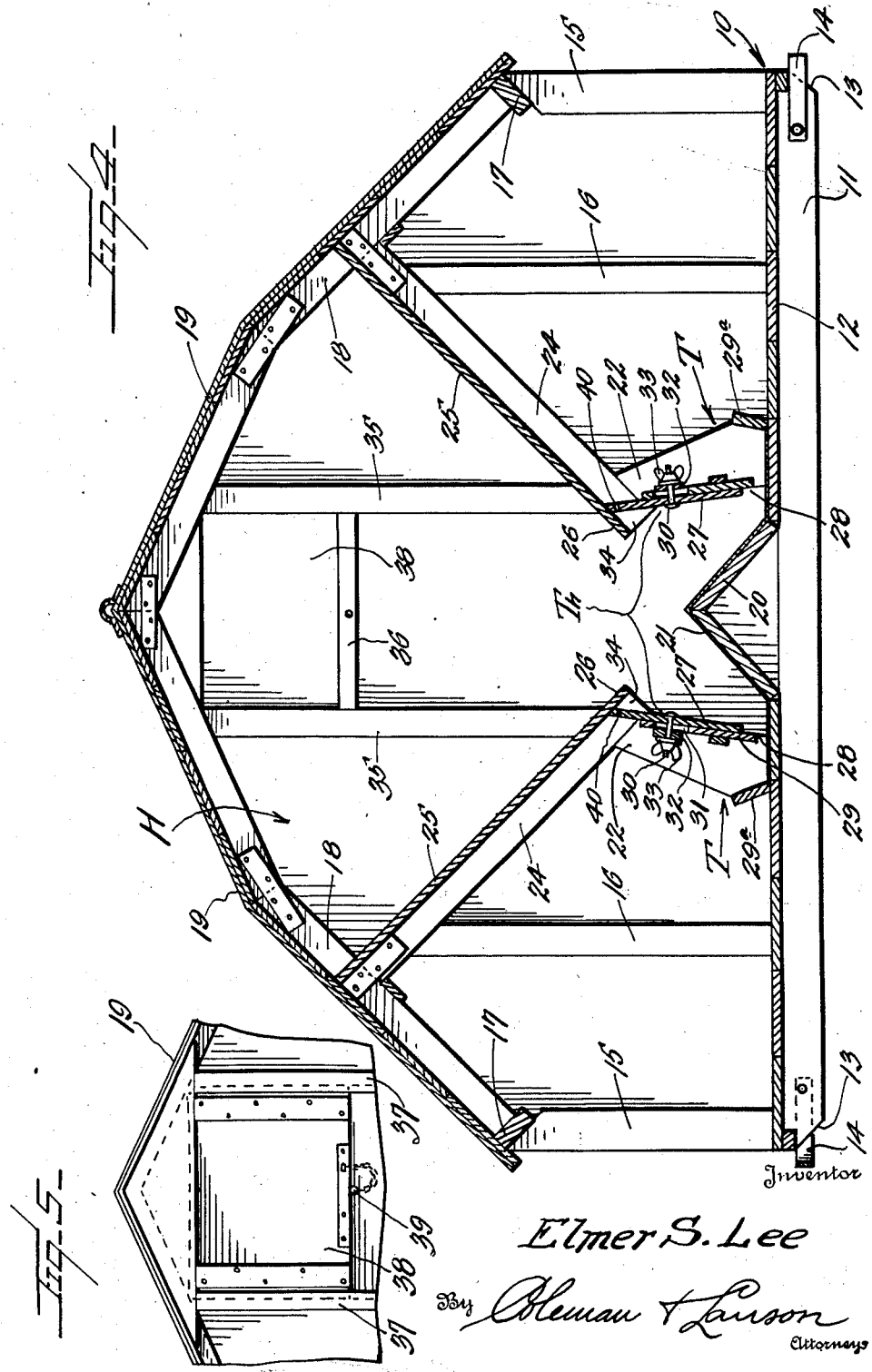
Inventor
Elmer S. Lee
By Coleman + Larson
Attorneys Patented Nov. 7, 1944

2,362,078

UNITED STATES PATENT OFFICE 2,362,078

GRAVITY FEED ANIMAL FEEDER

Elmer S. Lee, Woodbine, Iowa

Application October 31, 1942, Serial No. 464,077

3 Claims. (Cl. 119—53)

This invention relates generally to the class of animal husbandry, and pertains particularly to an improved feeder for hogs.

The present invention relates particularly to a gravity type self-feeding feeder for hogs. Many types of gravity feeding feeder devices have been devised for feeding or supplying ground feed of all kinds to troughs from which the animals may take the feed. However, in all of the previously known feeders of this type trouble has developed as a result of the feed material "bridging" the discharge outlet through which the feed material must pass from a supply bin or hopper into the feeding trough, with the result that the feed material ceases to flow after a short period of time, thus requiring the opening of the feeder and the manual working of the feed material so as to break the bridge and cause the material to continue to flow into the troughs. This bridging action of the feed material is due primarily to the packing of the material as a result of the weight or volume and, consequently, the larger the feeder the greater the difficulty that is experienced with this bridging of the material.

A principal object of the present invention, in view of the foregoing statement, is to provide a self-feeding feeder unit which will take a large quantity of ground feed and will continually discharge or supply the same from the storage bin or hopper to a feeding trough, without packing and bridging, so that the feeder may be placed in a field and filled with feed material and will continue to function without attention until it is empty.

Another object of the invention is to provide a gravity type self-feeding hog feeder which is constructed in a novel manner so that the animals can feed from the feed bin, under cover and, consequently, there is avoided the development of mud holes around the feeding troughs and the animals are kept in a cleaner condition than is possible where they are supplied with feed at open or uncovered troughs.

Another object of the invention is to provide a gravity type self-feeding feeder wherein the ground feed is discharged downwardly into an outlet throat leading to troughs, with novel means for preventing the development of a vacuum in the hopper or bin, as sometimes results, due to the sealing of all cracks by the fine dust which forms a part of the ground feed material, so that the continual flow of the feed material into the throat and to the feeding troughs is not hindered by such a vacuum.

The invention will be best understood from a consideration of the following detailed description taken in connection with the accompanying drawings, it being understood, however, that the invention is not to be considered as limited by the specific illustration or description but that such illustration and description constitute a preferred embodiment of the invention.

In the drawings:

Figure 1 is a view, partly in side elevation and partly in longitudinal section, of the feeder structure embodying the present invention.

Figure 2 is a fragmentary section taken upon the line 2—2 of Figure 1.

Figure 3 is a fragmentary section taken on the line 3—3 of Figure 1.

Figure 4 is a view in transverse section taken substantially on the line 4—4 of Figure 1.

Figure 5 is a view in elevation of the charging end of the feeder showing the charging door in closed position.

Referring now more particularly to the drawings, there is shown a bottom unit 10 which comprises a plurality of spaced parallel floor joists 11 which extend transversely of the feeder structure and which support the floor boards 12. These bottom or floor joists are cut obliquely at their ends, as indicated at 13, so that they may additionally function as sled runners for the feeder structure, whereby the structure may be attached to a tractor or a draft team and dragged to the selected location for the feeder. Suitable draft yokes or clevises 14 may be attached to the ends of the joists at the two sides of the structure, as shown in Figure 4, to facilitate this moving operation.

At each corner of the rectangular floor unit 10 is an upstanding corner stud 15 and inwardly from each stud is a second stud 16.

Extending lengthwise of each side of the structure and supported upon and connected to adjacent corner studs 15, is a rafter sill 17 which is sloped transversely inwardly and downwardly, as illustrated in Figure 4, and these sills, located at the two opposite sides of the feeder structure, support the rafter beams 18 upon which is supported the roof structure 19. The lower ends of such beams 18 have direct contact from above with the sills 17.

At the longitudinal center of the floor 12 the two center floor boards are disposed at an angle to one another to form the central longitudinally extending ridge 20. The surface of this center ridge and a portion of the floor upon each side thereof, has laid thereover a covering 21 which is preferably of metal.

Extending lengthwise of the floor upon each side of the ridge 20 is a series of feed troughs generally designated T. Each series of troughs comprises the plurality of short vertically disposed partition posts 22 which are spaced longitudinally of the floor structure, as shown in Figures 1 and 2, and which rests upon the surface covering 21, as shown in Figure 4. The inner side edges or opposing edges of these partition posts incline slightly inwardly or toward the longitudinal center of the structure, and thus the distance between the posts at the floor level is slightly greater than at the tops of the posts, as is clearly shown in Figure 4, and as is also shown in this figure, the posts are spaced outwardly from the adjacent lowest side of the ridge 20. As shown in Figure 2, the end post 22 of each trough series is at the end edge of the floor so that its outer face is in the plane of the outer faces of the adjacent studs 15 and 16 to provide a suitable means for the support of the end wall sheathing 23.

The end posts 22 of each bin series and certain intermediate posts support the inner ends of inwardly and downwardly converging hopper beams 24, the outer ends of which beams are secured against the under sides of the adjacent rafters 18, as is clearly shown in Figure 4. These hopper beams 24 support the bottom walls 25 for the hopper, which is generally designated H, and as is shown in Figure 4, while the top edges of the bottom walls 25 of the hopper are tightly joined to the under side of the roof structure 19, the lower edges of these walls extend only a short distance downwardly beyond the inner edges of the posts 22. These projecting edge portions of the walls 25 are indicated by the reference character 26, and such portions of these walls are termed by me the feed breaker as they perform the important function of breaking or loosening the feed as it passes from the hopper walls into the hopper throat which is the area designated T*h* lying between the trough inner walls 27.

These inner walls 27 of the troughs extend along the inclined inner sides of the posts 22, as shown in Figure 4, and contact at their top edges with the under surfaces of the overlying hopper walls 25, while at their lower edges they terminate short of the floor covering 21, thus providing the trough feed mouth 28 through which the feed moves from the throat into the troughs.

The outer sides of the troughs of each longitudinal series are defined by the low trough wall 29a which extends across the outer edges or sides of the posts 22.

The flow of feed material into each trough through the feed mouth 28 is controlled by the vertically adjustable gate 29 which is disposed against the outer face of the wall 27 and is adjustably held in position by the employment of a bolt 30, which passes through the wall 27 and through a vertical slot 31 in the gate and then through a loose cleat 32 which is disposed across the outer face of the gate, where it receives the thumb screw 33 which, when tightened up, forces the loose cleat 32 in against the gate and thus binds the latter in adjusted position.

At intervals along the inner or opposing sides of the walls 27 there are secured between these walls and the overhanging portion of each upper wall 25 or breaker portion 26 of such wall, the triangular reinforcing block 34. These blocks serve to prevent the great weight of a large quantity of feed material bearing down upon the breakers 26, from damaging these parts of the hopper.

Upon the inner side of each end wall there are secured the spaced vertically extending studs 35 which are substantially in vertical alignment with the adjacent end trough posts 22 and one end wall has formed therethrough, near the top, the charging opening 35a, the lower side of which is bordered by the sill 36.

Upon the outer side of the end wall through which the opening 35a is formed, are secured the vertical rabbeted guides 37, Figure 5, between which is slidably held a door 38 which is supported in raised or closed position by the securing pin 39 which is passed through a suitable aperture in the end wall and in the sill 36 across the lower edge of the door, as is shown in Figures 3 and 5.

As shown in Figure 4, with the construction described the roof structure 19, not only covers the hopper H but covers a substantial floor area extending from the two rows of troughs outwardly to the adjacent side edge of the floor unit, thus providing a covered or enclosed space at the outer side of each row of troughs, in which the hogs may stand while feeding. Such covered spaces are entered through the entrance opening extending the full length of the side of the structure and having a height equalling the height of the corner studs 15, as shown in Figure 4.

As previously stated, the feeder structure is built so that the hopper discharges into the centrally longitudinally extending space designated the throat, and as the feed passes into the throat it flows over the breaker edges 26 extending lengthwise of the top thereof at each side. The throat widens as it goes down from the space between the opposed breakers to the ridge 20 and the floor leading to the trough mouth 28. This throat is relatively short and does not hold much feed and as the feed falls the breakers break up the feed so that it is loose, and since the throat is short the weight of the feed therein will not cause the feed to again become compact. Consequently, the feed is fed downwardly and outwardly across the sides of the ridge 20 toward the bottom feed mouths 28 for the two rows or series of troughs.

Another feature of the structure which facilitates the smooth and regular or even feeding of the feed material from the hopper into the throat is the provision of air holes or vents 40 which are formed through the throat walls 27 at the top of each to open into the throat immediately underneath or behind the breakers 26. These holes let air in to prevent the formation of a vacuum which would hold the feed from dropping down. Such reduced air pressure condition or vacuum develops as a result of the fine flour which forms a part of all ground feed material, sifting into and sealing the cracks between the boards and other material of which the bin or hopper is constructed, thereby making the hopper air tight and, as a result, when the feed material flows down no air can get into the hopper and throat to take the place of the feed removed therefrom. This undesirable condition is prevented from developing by the provision of the vent holes which permit air to enter the top of the throat beneath the breakers as described.

It is also to be stated that the air holes or vents 40 aid materially in facilitating the letting out of heat in the throat T*h* and to permit cool air to mix in with the feed, especially when ground. The feed will heat according to the moisture content of the grain and has a tendency to sweat, resulting in bridging. The openings or vents 40 provide means for eliminating this disadvantage and which disadvantage is further avoided by having the ridge 20 or camel back, as it may be called, of considerable height and of material width at its base so as to have a minimum amount of feed in the short throat T*h* because the more feed within the throat the longer the heat will be held.

As is particularly illustrated in Figure 4 of the drawings, the base portion of the ridge or camel back 20 is of a width of more than one-half the distance between the trough feed mouths 28. This ridge or camel back 20 is also of a height of more than one-half the height or depth of the throat T*h*.

Each end wall may have a charging opening therein or such opening may be made in only one end wall if desired. Also, if desired, a partition can be installed in one end of the hopper, as shown in Figure 1, the partition being indicated by the reference 41, to provide a separate chamber or hopper for minerals and protein, the ground feed being placed in the other compartment. However, most animal feeders prefer to mix their protein and minerals together with the ground feed, such as corn, oats, barley, etc. and this mixture may all be placed into the hopper structure without using the partition wall 41, to be fed downwardly through the bottom feed mouths 28 into the feeding troughs.

As previously pointed out, the greatest difficulty which is experienced in the use of gravity feed feeding devices is the packing of the ground feed into the hopper so tightly that when the lower part of the feed supply is used up the tightly packed feed material forms a bridge of material across the feeding opening, and thus prevents the remainder of the material in the hopper from feeding into the troughs. By the provision of the throat T*h* which is wider at its bottom than at the top, and the breaker flanges or edges extending lengthwise of the throat at each side and at the top, the feeding material is loosened as it flows into the throat and spreads out in the wide bottom portion thereof so that it cannot again become compacted. As a result, it will flow freely from the sloping sides of the ridge 20 outwardly to the bottom feeding mouths 28 of the troughs.

As previously stated, the provision of the air vents 40 beneath the breakers also assists in this free movement of the feeding material by preventing the formation of a vacuum in the hopper and throat above the trough feed mouths 28.

While the use of separate holes 40 for the admission of air under the feed breakers 26, is preferred, it is to be understood that it is not intended that the invention be limited to this specific arrangement as it will be readily obvious that other means may be made use of for permitting air to enter under the breakers.

By the use of the holes as shown, the maximum supporting effect is provided for the feed breakers by the walls 27.

I claim:

1. A grain feeder for animals comprising a flat floor structure, an upstanding camel back extending along the floor structure, a hopper structure including downwardly converging bottom walls, the lower edges of said bottom walls being spaced apart and arranged at opposite sides of and in a plane above the high point of the camel back of the floor structure, throat walls positioned at opposite sides of the camel back and extending from the lower extremities of the bottom walls of the hopper to points spaced above the floor structure, said throat walls being in downward divergence, the bottom walls of the hopper having their lower portions extending beyond the top edges of the throat walls and forming eaves spaced from the throat walls and projecting downwardly within the throat between the throat walls to provide feed breakers, the throat between the throat walls being short, the high point of the camel back being at a point not less than the vertical center of the throat, said throat walls immediately adjacent to the bottom walls of the hopper being provided with air openings, the space between the lower margins of the throat walls and the floor structure constituting trough mouths, and an upstanding trough wall carried by the floor structure outwardly of each throat wall and spaced therefrom.

2. A grain feeder for animals comprising a flat floor structure, an upstanding camel back extending along the floor structure, a hopper structure including downwardly converging bottom walls, the lower edges of said bottom walls being spaced apart and arranged at opposite sides of and in a plane above the high point of the camel back of the floor structure, throat walls positioned at opposite sides of the camel back and each extending from a line located outwardly from the lower extremity of a bottom wall of the hopper downwardly and outwardly to a point spaced above the floor structure, the throat walls being downwardly divergent, the lower portions of the hopper walls extending inwardly and downwardly within the throat between the throat walls forming eaves providing feed breakers, the throat between the throat walls being short, the high point of the camel back being at a point not less than the vertical center of the throat, said throat walls immediately adjacent to the bottom walls of the hopper being provided with air openings lying under the said eaves, the space between the lower margins of the throat walls and the floor structure constituting trough mouths, an upstanding trough wall carried by the floor structure outwardly of each throat wall and spaced therefrom, and a gate carried by each of the throat walls for regulating the flow of grain out through the trough mouths afforded by the space below said side wall.

3. A grain feeder for animals comprising a flat floor structure, an upstanding camel back extending along the floor structure, a hopper structure including downwardly converging bottom walls, the lower edges of said bottom walls being spaced apart and arranged at opposite sides of and in a plane above the high point of the camel back of the floor structure, throat walls positioned at opposite sides of the camel back and each extending from a line located outwardly from the lower extremity of a bottom wall of the hopper downwardly and outwardly to a point spaced above the floor structure, the throat walls being downwardly divergent, the lower portions of the hopper walls extending inwardly and downwardly within the throat between the throat walls forming eaves providing feed breakers, the throat between the throat walls being short, the high point of the camel back being at a point not less than the vertical center of the throat, said throat walls immediately adjacent to the bottom walls of the hopper being provided with air openings lying under the said eaves, the space between the lower margins of the throat walls and the floor structure constituting trough mouths, an upstanding trough wall carried by the floor structure outwardly of each throat wall and spaced therefrom, and reinforcing blocks secured between the upper portions of the throat walls and the lower portions of the bottom walls of the hopper extending within the throat.

ELMER S. LEE.